(12) United States Patent
Kabeya

(10) Patent No.: US 7,609,828 B2
(45) Date of Patent: Oct. 27, 2009

(54) TELEPHONE TERMINAL, CALL SYSTEM AND TERMINAL CONTROL PROGRAM

(75) Inventor: Shozo Kabeya, Gamagori (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1045 days.

(21) Appl. No.: 10/649,892

(22) Filed: Aug. 28, 2003

(65) Prior Publication Data
US 2004/0052345 A1    Mar. 18, 2004

(30) Foreign Application Priority Data
Aug. 29, 2002    (JP)    ............................. 2002-251150

(51) Int. Cl.
*H04M 3/42* (2006.01)
*H04M 7/00* (2006.01)
(52) U.S. Cl. ........................... 379/201.01; 379/210.01; 379/230
(58) Field of Classification Search ................. 455/663; 379/90.01, 93.01, 93.09, 210.01, 230, 201.01; 370/352
See application file for complete search history.

(56) References Cited

U.S. PATENT DOCUMENTS 5,953,322 A * 9/1999 Kimball ...................... 370/328
5,953,407 A * 9/1999 Zhang et al. ........... 379/373.02

FOREIGN PATENT DOCUMENTS

| JP | A 10-155034 | 6/1998 |
| JP | A 2000-125040 | 4/2000 |

* cited by examiner

*Primary Examiner*—William J Deane
(74) *Attorney, Agent, or Firm*—Oliff & Berridge, PLC

(57) ABSTRACT

A telephone terminal capable of keeping a line to the other party's telephone terminal connected through a telephone line network in a connected state even after an output destination and an input source of audio signals are switched to an audio input/output unit. In a multifunction machine serving as the telephone terminal, a transmission path to be used for input/output of audio signals from/to an outside source is switched to an audio cable when a switch key is pressed during a voice call through the telephone line network. If an Internet call function is used at a PC, a voice call by the Internet call function may be performed indirectly by using a transmitter/receiver. The multifunction machine may automatically disconnect the line through the telephone line network when receiving a BT from the telephone line network after the transmission path is switched to the audio cable.

34 Claims, 5 Drawing Sheets

TELEPHONE TERMINAL, CALL SYSTEM AND TERMINAL CONTROL PROGRAM

BACKGROUND OF THE INVENTION (1) Field of the Invention

The present invention relates to a telephone terminal that performs a voice call by inputting/outputting voice based on audio signals transmitted through a telephone line network from a transmitter/receiver.

(2) Background Art

These days Internet terminals allowing data communication through Internet networks are becoming widespread. Such Internet terminals function to perform a voice call (hereinafter referred to as the "Internet call function") by inputting/outputting audio signals from/to an Internet network and inputting/outputting a voice based on the audio signals from/to a transmitter/receiver apparatus connnected to the Internet terminal (e.g. a headset: an apparatus with a microphone integrated into a headphone or an earphone).

In such an Internet terminal, voice based on the audio signals input/output from/to the Internet network may be output/input from a speaker and a microphone provided in the Internet terminal. However, depending on the location of the speaker and the microphone, the voice output from the speaker may be difficult to be heard or the volume of the voice input from the microphone may be low, so that a voice call in good condition cannot be obtained in some cases. Therefore, it is usual to use the transmitter/receiver apparatus connected to the Internet terminal to perform a voice call by the Internet call function.

However, the transmitter/receiver apparatus, which is a dedicated apparatus to be used for performing a voice call by the Internet call function, cannot be used for other purposes.

It is preferable that an apparatus to be used for other purposes can also be used as an apparatus for the Internet call function. Therefore, an apparatus dedicated to performing a voice call by the Internet call function is then no longer necessary.

An example of the apparatus to be used for the Internet call function is a known telephone terminal that performs a voice call by inputting/outputting voice based on audio signals transmitted through the telephone line network from a transmitter/receiver. Such a telephone terminal can be used as an ordinary telephone terminal when the Internet call function is not used.

Specifically, a telephone terminal that includes a telephone connection unit for connecting a line to the other party's telephone terminal as a telephone terminal on the other end of the line through a telephone line network. The telephone terminal is capable of performing a voice call with the other party's telephone terminal by inputting from a transmitter/receiver audio to be transmitted as audio signals to the other party's telephone terminal connected by the connection unit through the telephone line network and outputting from the transmitter/receiver audio based on audio signals transmitted from the other party's telephone terminal. The telephone terminal may also comprise an audio input/output unit that is provided in addition to the telephone connection unit and that is capable of inputting/outputting audio signals from/to an outside source through an Internet network. The telephone terminal may also comprise a switch unit for switching an output destination of audio signals based on audio input from the transmitter/receiver and an input source of audio signals to be output as audio from the transmitter/receiver between the telephone line network and the audio input/output unit according to an operation of a user.

In the telephone terminal constituted as above, the output destination of audio signals based on audio input from the transmitter/receiver and the input source of audio signals to be output as audio from the transmitter/receiver may be switched to the audio input/output unit capable of inputting/outputting audio signals from/to an outside source. Once the output destination and input source of audio signals are switched to the audio input/output unit, audio based on audio signals input from the outside source through the audio input/output unit is output from the transmitter/receiver, and audio signals based on audio input from the transmitter/receiver are output to the outside source through the audio input/output unit. Accordingly, by connecting the present telephone terminal to an Internet terminal having a function to perform a voice call (hereinafter referred to as the "Internet call function") based on audio signals input/output from/to an Internet network, a voice call by the Internet call function may be performed indirectly by using the transmitter/receiver of the present telephone terminal.

In terms of a communication charge for a voice call these days, it is usually less expensive to perform a voice call by the Internet call function through an Internet network than to perform a voice call through a telephone line network. Therefore, users who want to enjoy a voice call for a long time may prefer to perform a voice call by the Internet call function. To perform a voice call by the Internet call function indirectly by using the above described telephone terminal, it is necessary to make preparations in advance on the Internet terminal side in order to make a voice call by the Internet call function, since the telephone terminal cannot control the operation of the Internet terminal. "To make preparations" here means to perform an operation of starting the Internet terminal and an operation for starting use of the Internet call function and a voice call.

To perform a voice call by the Internet call function indirectly by using the telephone terminal, a user first performs voice call through the telephone line network by using the telephone terminal. Then, the user informs the other party that a voice call by the Internet call function will be performed if the Internet call function is available to the other party. "The Internet call function is available" means, for example, a state in which the other party has (or uses) a computer system or a telephone terminal having a function to achieve the Internet call function and can use the Internet call function normally.

Once both the user and the other party have completed preparation for performing a voice call using the Internet call function, the output destination and input source of audio signals are switched to the audio input/output unit. By disconnecting the line through the telephone line network the output destination and input source of audio signals are switched to the audio input/output unit, it will be possible to prevent the communication charge from increasing unnecessarily as time goes on due to the still connected line despite the already terminated voice call through the telephone line network (In Publication of Japanese Unexamined Patent Application No. 10-155034, page 9, paragraph [0074], the following description is included: Once a call through the Internet telephone is started as above, the calling side Internet telephone set $1a$ disconnects the connection through the ordinary telephone (S$14a$), and the call through the Internet telephone is continued afterward.).

However, it is preferable that the line to the other party's telephone terminal connected through the telephone line network remains connected for a while even after the output destination and input source of audio signals are switched to the audio input/output unit. This enables the output destination and input source of audio signals to be switched back to the telephone line network and confirm the status of the other end, if the voice of the other end cannot be heard after the output destination and input source of audio signals are switched to the audio input/output unit.

Then, it is possible to switch the output destination and input source of audio signals to the audio input/output unit again after confirming that the other end has completed preparation, or to choose to continue or stop the voice call through the telephone line network if the Internet call function is unavailable to the other end.

An object of the present invention is to provide a telephone terminal and a call system in which the line to the other party's telephone terminal connected through the telephone line network remains connected for a while even after the output destination and input source of audio signals are switched to the audio input/output unit as well as a terminal control program to be used in the telephone terminal and the call system.

SUMMARY OF THE INVENTION

The above and other objects are attained by a telephone terminal according to the present invention. The telephone terminal is provided with a telephone connection unit for connecting a line to the other party's telephone terminal as a telephone terminal on the other end of the line through a telephone line network, for performing a voice call with the other party's telephone terminal, by inputting from a transmitter/receiver audio to be transmitted as audio signals to the other party's telephone terminal connected by the connection unit through the telephone line network and outputting from the transmitter/receiver audio based on audio signals transmitted from the other party's telephone terminal. The telephone terminal comprises: an audio input/output unit provided in addition to the telephone connection unit and capable of inputting/outputting audio signals from/to an outside source; a switch unit for switching an output destination of audio signals based on audio input from the transmitter/receiver and an input source of audio signals to be output as audio from the transmitter/receiver between the telephone line network and the audio input/output unit according to an operation of a user; and a disconnection unit for disconnecting the line to the other party's telephone terminal through the telephone line network when a predetermined disconnection condition is satisfied in a state in which the line to the other party's telephone terminal is connected by the connection unit and the output destination and input source of audio signals are switched to the audio input/output unit by the switch unit.

According to the telephone terminal, the disconnection unit disconnects the line to the other party's telephone terminal when the predetermined disconnection condition is satisfied in the state in which the line to the other party's telephone terminal is connected by the connection unit and the output destination and input source of audio signals are switched to the audio input/output unit by the switch unit.

In other words, the line to the other party's telephone terminal may remain connected until the predetermined disconnection condition is satisfied even after the output destination and input source of audio signals are switched to the audio input/output unit.

Thus, it is possible to switch the output destination and input source of audio signals back to the telephone line network and confirm the status of the other end, if the voice of the other end cannot be heard after the output destination and input source of audio signals are switched to the audio input/output unit.

The above-mentioned telephone connection unit, which connects the line to the other party's telephone terminal through the telephone line network, performs calling to the other party's telephone terminal when, for example, an operation to call the other party's telephone terminal is performed by a user. If the other party's telephone terminal responds to the calling, the telephone connection unit places the line to the other party's telephone terminal in a connected state, i.e. enables a voice call with the other party's telephone terminal. Also, when an operation to respond to an incoming call from the other party's telephone terminal is performed by the user, the telephone connection unit enables a voice call with the other party's telephone terminal.

"An operation of a user" which causes the switch unit to switch the output destination and input source of audio signals to the audio input/output unit may be, but is not limited to, an operation of a dedicated operation portion (e.g. a switch) provided for performing switching to the audio input/output unit. "An operation of a user" also may be an operation according to a specific operation procedure for performing switching to the audio input/output unit. Examples of the specific operation procedure are to long press (continue to press for a specific time period) a specific operation button and to operate a plurality of operation buttons according to a specific order.

The "disconnection condition" which causes the line to the other party's telephone terminal to be disconnected by the disconnection unit may be termination of the voice call with the other party's telephone terminal connected through the telephone line network.

In another aspect of the present invention, there is provided a telephone terminal further comprising a detection unit for detecting termination of a voice call with the other party's telephone terminal to which the line is connected by the telephone connection unit, based on audio signals input/output from/to the other party's telephone terminal through the telephone line network, wherein the disconnection unit disconnects the line to the other party's telephone terminal when termination of a voice call is detected by the detection unit as an indication that the predetermined disconnection condition is satisfied.

According to the telephone terminal, when detection unit detects termination of a voice call with the other party's telephone terminal as an indication that the disconnection condition is satisfied, the line to the other party's telephone terminal is disconnected.

In a further aspect of the present invention, the above-mentioned detection unit detects an input of a control signal indicating termination of a voice call from the telephone line network as an indication that the voice call with the other party's telephone terminal is terminated.

According to the telephone terminal constituted as above, an input of a control signal from the telephone line network is detected as an indication that the voice call is terminated.

The "control signal" here means a signal (e.g. a busy tone, a dial tone and the like) indicating termination of the voice call which is output from switchboards constituting the telephone line network when an operation to terminate the voice call is performed by the other party's telephone terminal.

"The disconnection condition" may be that the state in which the voice call by the Internet call function is in progress has continued for the predetermined time period.

In a yet another aspect of the present invention, the above-mentioned disconnection unit disconnects the line to the other party's telephone terminal when the state in which the output destination and input source of audio signals are switched to the audio input/output unit by the switch unit has continued for the predetermined time period since the line to the other party's telephone terminal is connected by the connection unit as an indication that the predetermined disconnection condition is satisfied.

According to the telephone terminal constituted as above, the above-mentioned disconnection unit disconnects the line to the other party's telephone terminal when the state in which the output destination and input source of audio signals are switched to the audio input/output unit by the switch unit has continued for the predetermined time period since the line to the other party's telephone terminal is connected by the connection unit as an indication that the predetermined disconnection condition is satisfied.

In a yet another aspect of the invention, the telephone terminal further comprises a switching notification unit for notifying to which of the telephone line network and the audio input/output unit the output destination and input source of audio signals have been switched.

According to the telephone terminal constituted as above, a user can confirm to which of the telephone line network and the audio input/output unit the output destination and input source of audio signals have been switched by the switch unit, by the notification by the switching notification unit.

Notification by the switching notification unit may be performed by, for example, outputting a message indicating to which of the telephone line network and the audio input/output unit the output destination and input source of audio signals have been switched from a speaker. Then, a user can confirm to which of the telephone line network and the audio input/output unit the output destination and input source of audio signals have been switched by the message output from the speaker.

In another aspect of the invention, the telephone terminal further comprises a display unit for displaying a variety of information, wherein the switching notification unit notifies by displaying on the display unit to which of the telephone line network and the audio input/output unit the output destination and input source of audio signals are switched.

According to the telephone terminal constituted as above, a user can confirm to which of the telephone line network and the audio input/output unit the output destination and input source of audio signals have been switched by the indication on the display unit.

In a further aspect of the invention, the above-mentioned telephone terminal further comprises a disconnection notification unit for notifying that the line to the other party's telephone terminal is disconnected when the output destination and input source of audio signals are switched back to the telephone line network by the switch unit after the line to the other party's telephone terminal is disconnected by the disconnection unit.

According to the telephone terminal constituted as above, it is possible to notify that the line to the other party's telephone terminal has been disconnected when the output destination and input source of audio signals are switched back to the telephone line network by the switch unit after the line to the other party's telephone terminal is disconnected by the disconnection unit. Therefore, a user can confirm that the line to the other party's telephone terminal has been disconnected.

In this case, the switch unit may be designed to actually switch or not to switch the output destination and input source of audio signals back to the telephone line network if the line to the other party's telephone terminal has been disconnected by the disconnection unit when an operation of the user to switch is performed.

Notification by the disconnection notification unit may be performed by, for example, displaying a message indicating that the line to the other party's telephone terminal has been disconnected on a display unit provided for displaying a variety of information. Then, the user can confirm that the line to the other party's telephone terminal has been disconnected by the message on the display unit.

Alternatively, notification by the disconnection notification unit may be performed by outputting audio indicating that the line to the other party's telephone terminal is disconnected from a transmitter/receiver.

According to the telephone terminal constituted as above, a user can confirm that the line to the other party's telephone terminal has been disconnected by the audio output from the transmitter/receiver.

Once the line to the other party's telephone terminal is disconnected by the disconnection unit, a voice call with the other party's telephone terminal cannot be resumed even if the output destination and input source of audio signals are switched back to the telephone line network by the switch unit. However, if it is possible to perform calling to the other party's telephone terminal when the output destination and input source of audio signals are switched back to the telephone line network by the switch unit, a voice call with the other party's telephone terminal may be resumed.

In a yet further aspect of the invention, this is achieved by a telephone terminal which further comprises a storage unit for storing the telephone number of the other party's telephone terminal when the line to the other party's telephone terminal is disconnected by the disconnection unit. The telephone connection unit performs calling to the other party's telephone terminal based on the telephone number stored in the storage unit when the output destination and input source of audio signals are switched back to the telephone line network by the switch unit after the line to the other party's telephone terminal is disconnected by the disconnection unit. The telephone connection unit connects the line to the other party's telephone terminal if the other party's telephone terminal responds to the calling.

According to the telephone terminal constituted as above, when the line to the other party's telephone terminal is disconnected by the disconnection unit, the telephone number of the other party's telephone terminal is stored by the storage unit. Thereafter, when the output destination and input source of audio signals are switched back to the telephone line network by the switch unit, the telephone connection unit performs calling to the other party's telephone terminal based on the telephone number stored by the storage unit. If the other party's telephone terminal responds to the calling, the telephone connection unit connects the line to the other party's telephone terminal. Thus, a voice call with the other party's telephone terminal can be resumed even after the line to the other party's telephone terminal is disconnected by the disconnection unit.

In this case, the storage unit stores the telephone number used for performing the calling when the line to the other party's terminal is connected by performing the calling from the present telephone terminal. In contrast, the storage unit stores the telephone number notified from the telephone line network (i.e. switchboards constituting the telephone line network) when the line to the other party's terminal is connected by responding to the incoming call from the other party's telephone terminal.

In another aspect of the invention, the telephone terminal further comprises a calling instruction unit for instructing the telephone connection unit to perform calling to the other party's telephone terminal based on the telephone number stored in the storage unit, according to an operation of a user, wherein the telephone connection unit performs calling to the other party's telephone terminal based on the telephone number stored in the storage unit when the output destination and input source of audio signals are switched back to the telephone line network by the switch unit after the line to the other party's telephone terminal is disconnected by the disconnection unit as well as calling is instructed by the calling instruction unit.

According to the telephone terminal constituted as above, the telephone connection unit does not connect the line to the other party's telephone terminal unless instructed to perform calling by the instruction unit even when the output destination and input source of audio signals are switched to the telephone line network by the switch unit after the line to the other party's telephone terminal is once disconnected by the disconnection unit. Thus, a user may instruct the calling instruction unit to perform calling only when the user wants to resume the voice call to the other party's telephone terminal through the telephone line network. In other words, unnecessary calling and resulting connection to the other party's telephone terminal can be prevented.

The calling instruction unit, which instructs the telephone connection unit to perform calling to the other party's telephone terminal based on the telephone number stored in the storage unit, may be constituted, for example, by providing a dedicated operation portion (e.g. a switch) that instructs the telephone connection unit to perform calling when the dedicated operation portion is operated. The calling instruction unit may also be constituted to instruct the telephone connection unit to perform calling when an operation according to a predetermined specific operation procedure to instruct to perform calling is performed. The specific operation procedure is, for example, to long press (continue to press for a specific time period) a specific operation button or to operate a plurality of operation buttons according to a specific order.

In a yet another aspect of the invention, there is provided a call system which comprises: an Internet connection unit for connecting a line to the other party's Internet terminal as an Internet terminal on the other end of the line through an Internet network; an Internet terminal for inputting/outputting audio signals transmitted from the other party's Internet terminal connected by Internet connection unit through Internet network; and a telephone terminal connected to the Internet terminal through an audio transmission path capable of transmitting audio signals. The Internet terminal inputs/outputs audio signals from/to the telephone terminal and makes audio based on the audio signals input/output from a transmitter/receiver provided in the telephone terminal thereby to perform a voice call. The telephone terminal is provided with a telephone connection unit for connecting a line to the other party's telephone terminal as a telephone terminal on the other end of the line through a telephone line network, for performing a voice call with the other party's telephone terminal by inputting from a transmitter/receiver audio to be transmitted as audio signals to the other party's telephone terminal connected by the connection unit through the telephone line network and outputting from the transmitter/receiver audio based on audio signals transmitted from the other party's telephone terminal.

In this case, the telephone terminal includes: an audio input/output unit provided in addition to the telephone connection unit and capable of inputting/outputting audio signals from/to an outside source through an Internet network; a switch unit for switching an output destination of audio signals based on audio input from the transmitter/receiver and an input source of audio signals to be output as audio from the transmitter/receiver between the telephone line network and the audio input/output unit according to an operation of a user; and a disconnection unit for disconnecting the line to the other party's telephone terminal through the telephone line network when a predetermined disconnection condition is satisfied in a state in which the line to the other party's telephone terminal is connected by the connection unit and the output destination and input source of audio signals are switched to the audio input/output unit by the switch unit.

In a further aspect of the invention, there is provided a telephone terminal provided with a telephone connection unit for connecting a line to the other party's telephone terminal as a telephone terminal on the other end of the line through a telephone line network, for performing a voice call with the other party's telephone terminal by inputting from a transmitter/receiver audio to be transmitted as audio signals to the other party's telephone terminal connected by the connection unit through the telephone line network and outputting from the transmitter/receiver audio based on audio signals transmitted from the other party's telephone terminal, and with an Internet connection unit for connecting a line to the other party's Internet terminal as an Internet terminal on the other end of the line through an Internet network. A voice call with the other party's Internet terminal is performed by inputting from a transmitter/receiver audio to be transmitted as audio signals to the other party's Internet terminal connected by the Internet connection unit and outputting from the transmitter/receiver audio based on audio signals transmitted from the other party's Internet terminal. The telephone terminal comprises: a switch unit for switching an output destination of audio signals based on audio input from the transmitter/receiver and an input source of audio signals to be output as audio from the transmitter/receiver between the telephone line network and the Internet network; and a disconnection unit for disconnecting the line to the other party's telephone terminal through the telephone line network when a predetermined disconnection condition is satisfied in a state in which the line to the other party's telephone terminal is connected by the connection unit, the line to the other party's Internet terminal is connected by the Internet connection unit, and the output destination and input source of audio signals are switched to the Internet network by the switch unit.

In a yet another aspect of the invention, there is provided a terminal control program to make a computer system execute a variety of processes for controlling a telephone terminal that performs a voice call with the other party's telephone terminal by inputting from a transmitter/receiver audio to be transmitted as audio signals to the other party's telephone terminal through the telephone line network and outputting from the transmitter/receiver audio based on audio signals transmitted from the other party's telephone terminal. The terminal control program includes: a telephone connection process for connecting the line to the other party's telephone terminal through the telephone line network; a switch process to switch an output destination of audio signals based on audio input from a transmitter/receiver and an input source of audio signals to be output as audio from the transmitter/receiver between the telephone line network and an audio input/output unit for inputting/outputting audio signals from/to an outside source according to an operation by a user; and a disconnection process for disconnecting the line to the other party's telephone terminal through the telephone line network when a predetermined disconnection condition is satisfied in a state in which the line to the other party's telephone terminal is connected in the telephone connection process, and the output destination and input source of audio signals are switched to the audio input/output unit in the switch process.

The terminal control program may be constituted to include a detection process for detecting termination of a voice call with the other party's telephone terminal to which the line is connected in the telephone connection process, based on audio signals input/output from/to the other party's telephone terminal through the telephone line network. In this case, the line to the other party's telephone terminal is disconnected in the disconnection process when termination of a voice call is detected in the detection process as an indication that the predetermined disconnection condition is satisfied.

The terminal control program may be constituted such that, in the detection process, an input of a control signal indicating termination of a voice call from the telephone line network is detected as an indication that the voice call with the other party's telephone terminal is terminated.

The terminal control program may be constituted such that, in the disconnection process, the line to the other party's telephone terminal is disconnected when the state in which the output destination and input source of audio signals are switched to the audio input/output unit in the switch process has continued for the predetermined time period since the line to the other party's telephone terminal is connected in the connection process as an indication that the predetermined disconnection condition is satisfied.

The terminal control program may be constituted to include a switching notification process for notifying to which of the telephone line network and the audio input/output unit the output destination and input source of audio signals are switched.

The terminal control program may be constituted such that, in the switching notification process, notification is performed by displaying to which of the telephone line network and the audio input/output unit the output destination and input source of audio signals are switched on the display unit for displaying a variety of information.

The terminal control program may be constituted to include a disconnection notification process for notifying that the line to the other party's telephone terminal is disconnected when the output destination and input source of audio signals are switched back to the telephone line network in the switch process after the line to the other party's telephone terminal is disconnected in the disconnection process.

Furthermore, the terminal control program may be constituted such that, in the disconnection notification process, notification is performed by outputting audio indicating disconnection of the line to the other party's telephone terminal from the transmitter/receiver.

The terminal control program may be constituted to further include a storage process for storing the telephone number of the other party's telephone terminal when the line to the other party's telephone terminal is disconnected in the disconnection process, wherein, in the telephone connection process, calling to the other party's telephone terminal based on the telephone number stored in the storage process is performed when the output destination and input source of audio signals are switched back to the telephone line network in the switch process after the line to the other party's telephone terminal is disconnected in the disconnection process, and wherein the line to the other party's telephone terminal is connected if the other party's telephone terminal responds to the calling.

The terminal control program may be constituted to further include a calling instruction process for instructing the telephone connection unit to perform calling to the other party's telephone terminal based on the telephone number stored in the storage process, according to an operation of a user, wherein, in the telephone connection process, calling to the other party's telephone terminal based on the telephone number stored in the storage process is performed when the output destination and input source of audio signals are switched back to the telephone line network in the switch process after the line to the other party's telephone terminal is disconnected in the disconnection process as well as calling is instructed in the calling instruction process.

In a further aspect of the invention, there is provided a terminal control program to make a computer system execute a variety of processes for controlling a telephone terminal that performs a voice call with the other party's telephone terminal by inputting from a transmitter/receiver audio to be transmitted as audio signals to the other party's telephone terminal through the telephone line network and outputting from the transmitter/receiver audio based on audio signals transmitted from the other party's telephone terminal, and performs a voice call with the other party's Internet terminal by inputting from a transmitter/receiver audio to be transmitted as audio signals to the other party's Internet terminal through the Internet network and outputting from the transmitter/receiver audio based on audio signals transmitted from the other party's Internet terminal.

The terminal control program includes: a telephone connection process for connecting the line to the other party's telephone terminal through the telephone line network; an Internet connection process for connecting the line to the other party's Internet terminal through the Internet network; and a switch process to switch an output destination of audio signals based on audio input from a transmitter/receiver and an input source of audio signals to be output as audio from the transmitter/receiver between the telephone line network and the Internet network according to an operation by a user. The terminal control program also includes a disconnection process for disconnecting the line to the other party's telephone terminal through the telephone line network when a predetermined disconnection condition is satisfied in a state in which the line to the other party's telephone terminal is connected in the telephone connection process, the line to the other party's Internet terminal in the Internet connection process, and the output destination and input source of audio signals are switched to the Internet network in the switch process.

The terminal control program may be constituted to further include a detection process for detecting termination of a voice call with the other party's telephone terminal to which the line is connected in the telephone connection process, based on audio signals input/output from/to the other party's telephone terminal through the telephone line network. In this case, the line to the other party's telephone terminal is disconnected in the disconnection process when termination of a voice call is detected in the detection process as an indication that the predetermined disconnection condition is satisfied.

The terminal control program may be constituted such that, in the detection process, an input of a control signal indicating termination of a voice call from the telephone line network is detected as an indication that the voice call with the other party's telephone terminal is terminated.

The terminal control program may be constituted such that, in the disconnection process, the line to the other party's telephone terminal is disconnected when the state in which the output destination and input source of audio signals are switched to the Internet network in the switch process has continued for the predetermined time period since the line to the other party's telephone terminal is connected in the connection process as an indication that the predetermined disconnection condition is satisfied.

The terminal control program may be constituted to include a switching notification process for notifying to which of the telephone line network and the Internet network the output destination and input source of audio signals are switched.

The terminal control program may be constituted such that, in the switching notification process, notification is performed by displaying to which of the telephone line network and the Internet network the output destination and input source of audio signals are switched on the display unit for displaying a variety of information.

The terminal control program may be constituted to include a disconnection notification process for notifying that the line to the other party's telephone terminal is disconnected when the output destination and input source of audio signals are switched back to the telephone line network in the switch process after the line to the other party's telephone terminal is disconnected in the disconnection process.

Furthermore, the terminal control program may be constituted such that, in the disconnection notification process, notification is performed by outputting audio indicating disconnection of the line to the other party's telephone terminal from the transmitter/receiver.

The terminal control program may be constituted to further include a storage process for storing the telephone number of the other party's telephone terminal when the line to the other party's telephone terminal is disconnected in the disconnection process, wherein, in the telephone connection process, calling to the other party's telephone terminal based on the telephone number stored in the storage process is performed when the output destination and input source of audio signals are switched back to the telephone line network in the switch process after the line to the other party's telephone terminal is disconnected in the disconnection process, and wherein the line to the other party's telephone terminal is connected if the other party's telephone terminal responds to the calling.

The terminal control program may be constituted to further include a calling instruction process for instructing the telephone connection unit to perform calling to the other party's telephone terminal based on the telephone number stored in the storage process, according to an operation of a user, wherein, in the telephone connection process, calling to the other party's telephone terminal based on the telephone number stored in the storage process is performed when the output destination and input source of audio signals are switched back to the telephone line network in the switch process after the line to the other party's telephone terminal is disconnected in the disconnection process as well as calling is instructed in the calling instruction process.

The above described terminal control programs are provided via storage media such as FDs, CD-ROMs and memory cards, or communication networks such as the Internet to a telephone terminal itself, a computer system or a user who uses them. The computer system that executes these terminal control programs may be, for example, a computer system embedded in the telephone terminal, or a computer system connected to the telephone terminal through a wireless or a cable communication path allowing data communication therebetween.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
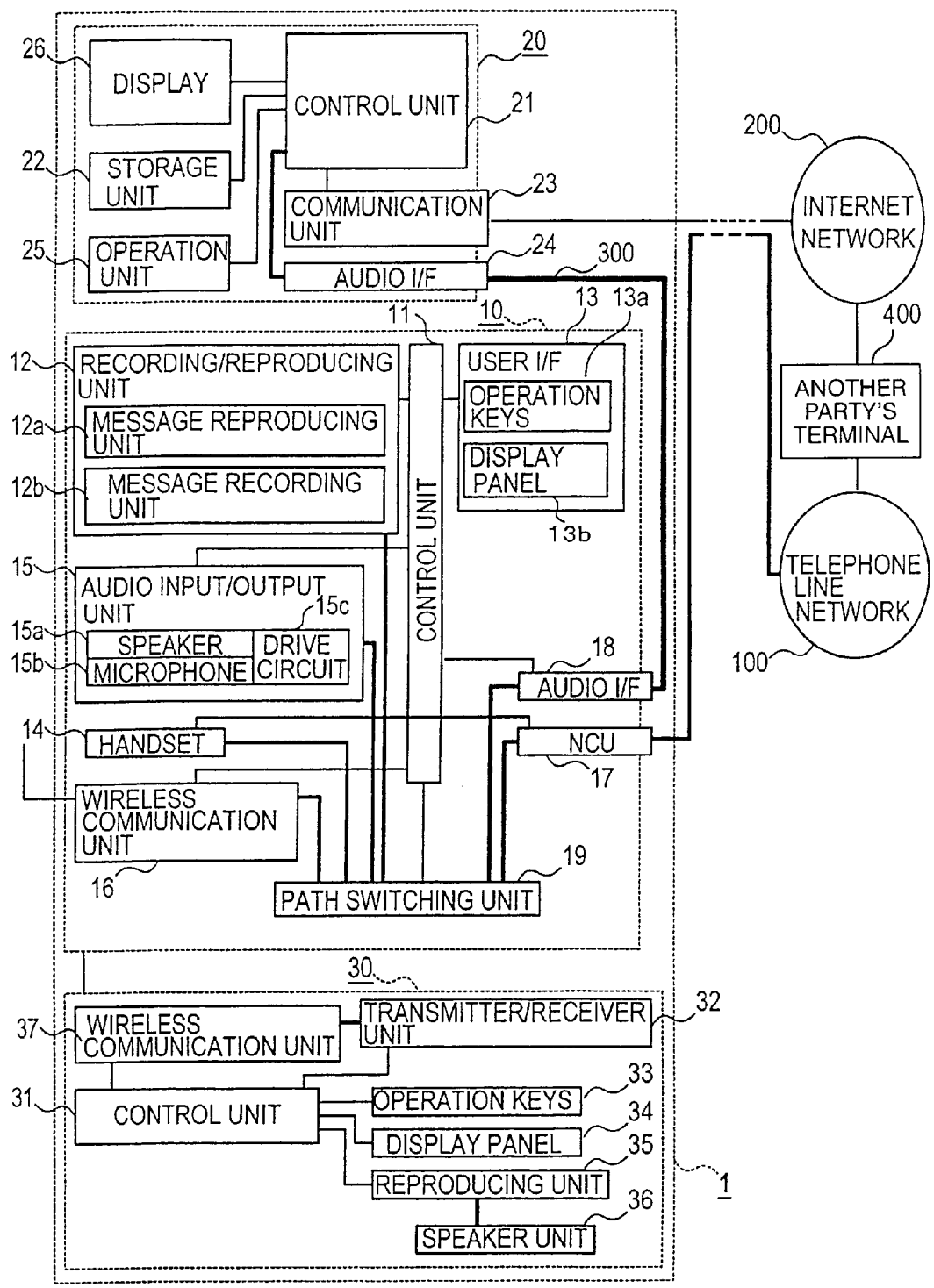
FIG. 1 is a block diagram showing the control system of a call system according to a preferred embodiment.

As shown in FIG. 1, a call system 1 comprises a multifunction machine 10 having a function to perform a voice call based on audio signals transmitted through a telephone line network 100 and a personal computer (hereinafter referred to as the "PC") 20 capable of performing data communication through an Internet network 200. The multifunction machine 10 and the PC 20 are interconnected through an audio cable 300 capable of transmitting audio signals.

The multifunction machine 10 comprises a control unit 11 for controlling the operation of the entire multifunction machine 10, a recording/reproducing unit 12 for recording audio signals and reproducing audio based on audio signals, a user interface (hereinafter referred to as the "user I/F") 13, a handset 14 that is a transmitter/receiver to be used in the state in which it is detached from the multifunction machine 10, an audio input/output unit 15 for inputting/outputting audio. The multifunction machine 10 also comprises a wireless communication unit 16 for performing wireless communication, an NCU (Network Control Unit) 17 for inputting/outputting audio signals transmitted through the telephone line network 100, an audio signal interface (hereinafter referred to as the "audio I/F") 18 for inputting/outputting audio signals transmitted through the audio cable 300, a path switching unit 19 for establishing a transmission path of audio signals within the multifunction machine 10 and a handset terminal 30 for wireless calls that performs wireless communication with the main unit of the multifunction machine 10 (i.e. wireless communication unit 16).

Among these, the recording/reproducing unit 12 includes a message reproducing unit 12a for reproducing audio based on various audio signals that have been previously recorded and a message recording unit 12b for recording a message left on a voice mail recording as audio signals. In the message reproducing unit 12a, audio signals such as a ringing tone to be used when an incoming call is received, a hold tone to be used when a voice call is placed on hold, a voice mail prompt message indicating that recording of a message will be started on voice mail recording, and a disconnection message for notifying that the line through the telephone line network is disconnected in the after-mentioned process (see FIG. 2) are recorded.

The user I/F 13 comprises operation keys 13a including a plurality of keys and a display panel 13b for displaying a variety of information. The operation keys 13a specifically include a hold key for starting/terminating the hold state of a voice call, a call start key for starting a voice call using the audio input/output unit 15 as a transmitter/receiver (a so-called "hands-free call"), a call end key for terminating a hands-free call, and a switch key for switching the transmission path to be used for input/output of audio signals from/to the outside of the multifunction machine 10 between either the NCU 17 or the audio I/F 18 in the after-mentioned processing procedure (see FIG. 2).

The audio input/output unit 15 includes a speaker 15a, a microphone 15b and a drive circuit 15c for driving the speaker 15*a* and the microphone 15*b*. The audio input/output unit 15 may be used for performing a hands-free call by using the speaker 15*a* and the microphone 15*b* as a transmitter/receiver as well as for outputting audio based on various audio signals from the speaker 15*a*.

The wireless communication unit 16 performs a wireless call by transmitting/receiving various signals including audio signals to/from the handset terminal 30 via wireless communication.

The path switching unit 19 switches the transmission path to be used for input/output of audio signals from/to the outside of the multifunction machine 10 between either the NCU 17 or the audio I/F 18, in accordance with a command from the control unit 11 (based on an operation of the switch key in the after-mentioned processing procedure (see FIG. 2)), thereby allowing audio signals to be input/output.

When an operation to start a call (hereinafter referred to as an "off-hook operation") is performed by a component that functions as a transmitter/receiver (the handset 14, the audio input/output unit 15 or the handset terminal 30 (i.e. the wireless communication unit 16); hereinafter referred to as the "transmitter/receiver or the like"), the path switching unit 19 sets the transmission destination (the output destination) of audio signals input from the outside source and the transmission source (the input source) of audio signals to be output to the outside source to the transmitter/receiver or the like by which the off-hook operation is performed, thereby allowing audio to be input/output.

Specifically, the transmission destination and the transmission source are set to the handset 14 when the handset 14 is off-hooked from the main unit of the multifunction machine 10, to the audio input/output unit 15 when the call start key among the operation keys 13*a* of the user I/F 13 is pressed, and to the wireless communication unit 16 (handset terminal 30) when an operation to start a call is performed by the handset terminal 30 (by a call start key included in the after-mentioned operation keys 33).

Also, when an off-hook operation has not been performed within a predetermined time period since an incoming call from the telephone line network 100 is received, the path switching unit 19 sets the transmission destination and the transmission source of audio signals to the recording/reproducing unit 12, in accordance with a command from the control unit 11.

Once the transmission destination and the transmission source are set to the recording/reproducing unit 12, the recording/reproducing unit 12 reproduces the voice mail prompt message recorded in the message reproducing unit 12*a* in accordance with a command from the control unit 11, and thereby the audio signal of the voice mail prompt message is output to the source of the incoming call through the telephone line network 100. After the output of the audio signal of the voice mail prompt message, audio signals input from the source of the incoming call through the telephone line network 100 are recorded by the message recording unit 12*b*.

The handset terminal 30 comprises a control unit 31 for controlling the operation of the entire handset terminal 30, a transmitter/receiver unit 32 including a speaker, a microphone and a drive circuit for driving the speaker and the microphone, operation keys 33 including a plurality of keys, a display panel 34 for displaying a variety of information, a reproducing unit 35 for reproducing various audio signals that have been previously recorded, a speaker unit 36 including a speaker and a drive circuit for driving the speaker that outputs audio based on the audio signals reproduced by the reproducing unit 35 and a wireless communication unit 37 for transmitting/receiving various signals including audio signals via wireless communication to/from the main unit of the multifunction machine 10 (i.e. the wireless communication unit 16 therein).

Figure 2:
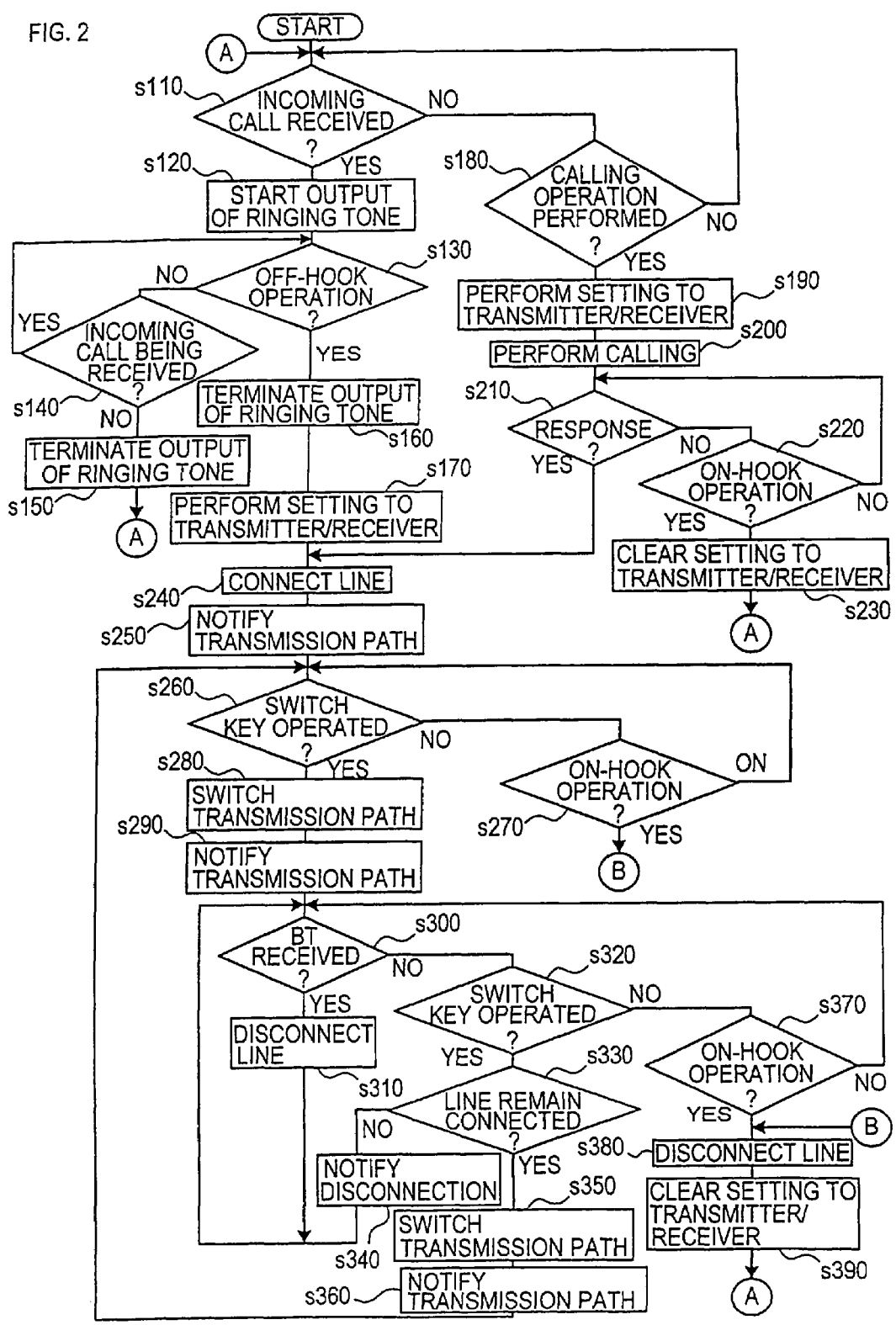
FIG. 2 is a flowchart showing a processing procedure executed by a multifunction machine.

The operation keys 33 provided in the handset terminal 30 specifically include a call start key for starting a voice call, an end key for terminating a voice call, a hold key for starting/terminating the hold state of a voice call, and a switch key for switching the transmission path to be used for input/output of audio signals from/to the outside of the multifunction machine 10 in the after-mentioned processing procedure (see FIG. 2).

In the reproducing unit 35, audio signals, such as a ringing tone to be used when an incoming call is received, a hold tone to be used when a voice call is placed on hold and a disconnection message to notify that the line is disconnected in the after-mentioned processing procedure (see FIG. 2), are recorded.

The PC 20 comprises a control unit 21 for controlling the operation of the entire PC 20, a storage unit 22 for storing a variety of information, a communication unit 23 for connecting the PC 20 to the Internet network 200, an audio signal interface (hereinafter referred to as the "audio I/F") 24 for inputting/outputting audio signals through the audio cable 300, an operation unit 25 including a keyboard and a mouse, and a display 26.

The PC 20 has a function to perform a voice call based on audio signals transmitted through the Internet network 200 (hereinafter referred to as the "Internet call function"). The Internet call function is fulfilled by executing the below-mentioned call enabling process, call transmission/reception process and call termination process according to the procedure indicated by application software (hereinafter referred to as the "call software") installed in the storage unit 22.

The call enabling process is a process to establish a connection (a connection of a logical communication path) between the PC 20 and a PC having the same call software installed among other PCs capable of performing data communication through the Internet network 200 and thereby to start data communication with the connected PC. The call enabling process is executed when an operation to specify a PC to be connected is performed by the operation unit 25 during the run state of the call software.

The call transmission/reception process is a process to generate packet data based on audio signals and transmit the data to the connected PC through the communication unit 23 and the Internet network 200 as well as to generate audio signals based on packet data transmitted from the connected PC through the Internet network 200 and the communication unit 23. In the present embodiment, the packet data is generated based on audio signals input from the multifunction machine 10 through the audio cable 300 and the audio I/F 24, and then the data is output to the Internet network 200. Also, audio signals generated based on packet data received through the Internet network 200 are output to the multifunction machine 10 through the audio I/F 24 and the audio cable 300.

The call transmission/reception process is executed repeatedly from when the call enabling process is executed until when the call termination process is executed, and thereby a voice call is performed between the PC 20 (i.e. the multifunction machine 10 connected to the PC 20) and the PC connected through the Internet network 200.

The call termination process is a process to terminate the use of the Internet call function by releasing the connection to the connected PC (disconnection of a logical communication path). The call termination process is executed when an operation to specify another PC as a call recipient or an operation to terminate the call software is performed by the operation unit 25. The call software is designed to transmit a release signal for notifying release of connection from the PC 20 with the call software installed to the connected PC when an operation to terminate the call software itself is performed. The PC 20 also executes the call termination process when the release signal is received.

In a certain section (a section from the user to the telephone central office) of the communication path from the communication unit 23 of the PC 20 to the Internet network 200, the telephone line connecting from the NCU 17 of the multifunction machine 10 to the telephone line network 100 is shared, although no detailed explanation about this is provided here. In this section, audio signals to be transmitted through the telephone line network 100 and data to be transmitted through the Internet network 200 are transmitted at the same time by ADSL (Asymmetric Digital Subscriber Line) technology.

[The Processing Procedure by the Control Unit 11 of the Multifunction Machine 10]

The processing procedure executed repeatedly by the control unit 11 provided in the multifunction machine 10 from when the multifunction machine 10 is activated (the power: ON) until when it is stopped (the power: OFF) will now be described below with reference to FIG. 2.

The control unit 11 first determines whether or not an incoming call from another telephone terminal (hereinafter referred to as the "calling telephone terminal") has been received through the telephone line network 100 (s110).

When it is determined that an incoming call is received through the telephone line network 100 (s110: YES), the control unit 11 starts output of a ringing tone (s120). Specifically, a control signal to start reproducing a ringing tone is provided to the recording/reproducing unit 12, and then the recording/reproducing unit 12 which has received the control signal starts reproducing the ringing tone by the message reproducing unit 12a. Subsequently, a control signal to set a transmission path of audio signals from the recording/reproducing unit 12 to the audio input/output unit 15 is provided to the path switching unit 19, and then the path switching unit 19 which has received the control signal sets the transmission path from the recording/reproducing unit 12 to the audio input/output unit 15.

Thus, output of the ringing tone through the speaker 15a of the audio input/output unit 15 is started.

In the process of s120, the control signal to start reproducing a ringing tone is provided also to the handset terminal 30 through the wireless communication unit 16, and the handset terminal 30 which has received the control signal starts reproducing a ringing tone by the reproducing unit 35 as well as outputs the ringing tone through the speaker unit 36.

Then, the control unit 11 determines whether or not an off-hook operation has been performed (s130) by checking whether any operation to start a call has been performed by a transmitter/receiver or the like.

When it is determined that an off-hook operation has not been performed (s130: NO), the control unit 11 then determines whether or not the incoming call determined in the process of s110 is still being received (s140).

If it is determined that the incoming call is still being received (s140: YES), the procedure returns to the process of s130.

If it is determined that the incoming call is not being received (s140: NO), the control unit 11 terminates output of the ringing tone (s150). In this process, a control signal to terminate reproduction of the ringing tone is provided to the recording/reproducing unit 12, and then the recording/reproducing unit 12 which has received the control signal terminates reproduction of the ringing tone by the message reproducing unit 12a.

Subsequently, a control signal to clear the setting of the transmission path of audio signals from the recording/reproducing unit 12 to the audio input/output unit 15 is provided to the path switching unit 19, and the path switching unit 19 which has received the control signal clears the setting of the transmission path from the recording/reproducing unit 12 to the audio input/output unit 15. By this, output of the ringing tone through the speaker 15a of the audio input/output unit 15 is terminated.

In the process of s150, the control signal to terminate reproduction of the ringing tone is provided also to the handset terminal 30 through the wireless communication unit 16, and the handset terminal 30 which has received the control signal terminates reproduction of the ringing tone by the reproducing unit 35. Once the process of s150 has been completed, the procedure by the control unit 11 returns to the process of s110.

When it is determined in the process of s130 that an off-hook operation has been performed (s130: YES), the control unit 11 terminates output of the ringing tone (s160). The process of s160 is the same as the process of s150.

Then, the control unit 11 sets the transmission destination of audio signals input from the outside source and the transmission source of audio signals to be output to the outside source to the transmitter/receiver or the like by which the off-hook operation is performed (s170). In this process, a control signal to set the transmission destination and the transmission source of audio signals to the transmitter/receiver or the like by which the off-hook operation is performed is provided to the path switching unit 19, and the path switching unit 19 which has received the control signal sets the transmission destination and the transmission source of audio signals to the transmitter/receiver or the like by which the off-hook operation has been performed.

When it is determined in the process of s110 that an incoming call has not been received through the telephone line network 100 (s110: NO), the control unit 11 then determines whether or not a calling operation has been performed (s180).

The "calling operation," which is an operation to specify a telephone terminal to be called through the telephone line network 100 (herein after referred to as the "called telephone terminal"), particularly means an operation to input the telephone number of the called telephone terminal using the operation keys 13a of the user I/F 13 after an off-hook operation by the handset 14 or the audio input/output unit 15 as the transmitter/receiver or the like. The "calling process" also means an operation to input the telephone number of the called telephone terminal using the operation keys 33 of the handset terminal 30 after an off-hook operation by the handset terminal 30 as the transmitter/receiver or the like.

When it is determined in the process of s180 that a calling operation has not been performed (s180: NO), the procedure by the control unit 11 returns to the process of s110.

On the other hand, when it is determined in the process of s180 that a calling operation has been performed (s180: YES), the control unit sets the transmission destination of audio signals input from the outside source and the transmission source of audio signals to be output to the outside source to the transmitter/receiver or the like by which the calling operation has been performed (s190). The process of s190 is the same as the process of s170.

Then, the control unit 11 performs the calling of the called telephone terminal specified by the calling operation in the process of s180 (s200). In this process, the calling is performed by outputting a control signal indicating the telephone number of the called telephone terminal specified in the process of s180 to the telephone line network 100.

Subsequently, the control unit 11 determines whether or not the called telephone terminal has responded (s210). If it is determined that the called telephone terminal has not responded (s210: NO) and that an on-hook operation has not been performed (s220: NO), the procedure returns to the process of s210. The "on-hook operation," which is an operation to terminate a call by a transmitter/receiver or the like, particularly means an operation to on-hook the handset 14, to press the call end key included in the operation keys 13a of the user I/F 13, or to press the call end key included in the operation keys 33 of the handset terminal 30.

If it is determined in the process of s220 that an on-hook operation has been performed (s220: YES), the control unit 11 clears the setting of the transmission destination and the transmission source to the transmitter/receiver or the like in the process of s190 (s230). Specifically, a control signal to clear the setting of the transmission destination and the transmission source of audio signals to the transmitter/receiver or the like is provided to the path switching unit 19, and the path switching unit 19 which has received the control signal clears the setting of the transmission destination and the transmission source of audio signals thereby to make audio signals unable to be input/output.

Once the process of s230 is completed, the procedure by the control unit 11 returns to the process of s110.

When the process of s170 is completed or when it is determined that the called telephone terminal has responded (s210: YES), the control unit 11 connects a line to the calling telephone terminal from which an incoming call is received or to the called telephone terminal which has responded (s240). Specifically, a control signal to set a transmission path to be used for input/output of audio signals from/to an outside source to the NCU 17 is provided to the path switching unit 19, and then the path switching unit 19 which has received the control signal sets the transmission path to be used for input/output of audio signals from/to an outside source to the NCU 17.

Thus, the transmission path of audio signals from the telephone line network 100 to the transmitter/receiver or the like set in the process of s170 or s190 through the NCU 17 is established. The line from the multifunction machine 10 to the calling telephone terminal or to the called telephone terminal is connected through the telephone line network 100, and thereby a voice call with the calling telephone terminal or the called telephone terminal is started.

Subsequently, the control unit 11 notifies the transmission path used for input/output of audio signals from/to the outside of the multifunction machine 10 (s250). Specifically, a control signal for displaying a message indicating that the telephone line network 100 is used as the transmission path is provided to the user I/F 13, and the user I/F 13 which has received the control signal displays the message indicating that the telephone line network 100 is used as the transmission path by the display panel 13b. A control signal for displaying a message indicating that the telephone line network 100 is used as the transmission path is provided also to the handset terminal 30, and the handset terminal 30 which has received the control signal displays the message indicating that the telephone line network 100 is used as the transmission path by the display panel 34.

Then, the control unit 11 determines whether or not the switch key has been operated (s260).

When it is determined that the switch key has not been operated (s260: NO), the control unit 11 then determines whether or not an on-hook operation has been performed (s270).

If it is determined that an on-hook operation has not been performed (s270: NO), the procedure by the control unit 11 returns to the process of s260.

When it is determined in the process of s260 that the switch key has been operated (s260: YES), the control unit 11 makes the transmission path used for input/output of audio signals from/to the outside of the multifunction machine 10 switched from the telephone line network 100 to the audio cable 300 (s280). Specifically, a control signal to set the transmission path to be used for input/output of audio signals from/to the outside source to the audio I/F 18 is provided to the path switching unit 19, and the path switching unit 19 which has received the control signal sets the transmission path to be used for input/output of audio signals from/to the outside source to the audio I/F 18. By this, the transmission path used for input/output of audio signals from/to the outside of the multifunction machine 10 is switched from the telephone line network 100 to the audio cable 300.

Thus, the transmission path of audio signals from the audio cable 300 to the transmitter/receiver or the like set in the process of s170 or s190 through the audio I/F 18 is established, so that audio based on audio signals input/output from/to the PC 20 through the audio cable 300 may be output/input from the transmitter/receiver or the like. If use of the Internet call function has been enabled in the PC 20, a voice call by the Internet call function is started indirectly by using the transmitter/receiver or the like provided in the multifunction machine 10.

When the process of s280 is completed, the line remains in a connected state so that a voice call through the telephone line network 100 can be resumed if the transmission path is switched back in a subsequent process (see the process of s350).

Then, the control unit 11 again notifies the transmission path used for input/output of audio signals from/to the outside of the multifunction machine 10 (s290). In this process, a control signal for displaying a message indicating that the audio cable 300 is used as the transmission path is provided to the user I/F 13, and the user I/F 13 which has received the control signal displays the message indicating that the audio cable 300 is used as the transmission path by the display panel 13b. A control signal for displaying a message indicating that the audio cable 300 is used as the transmission path is provided also to the handset terminal 30, and the handset terminal 30 which has received the control signal displays the message indicating that the audio cable 300 is used as the transmission path by the display panel 34.

The control unit 11 then determines whether or not a busy tone (BT) has been received through the telephone line network 100 (s300). A "busy tone" is a tone received from the telephone line network 100 (i.e. switchboards constituting the telephone line network 100) through the NCU 17 when a voice call through the telephone line network 100 is terminated by the other party's telephone terminal 400. Specifically, in the process of s300, it is checked whether or not reception of a busy tone from the telephone line network 100, which indicates termination of the voice call through the telephone line network 100, has been detected.

When it is determined in the process of s300 that a busy tone has been received (s300: YES), the control unit 11 disconnects the line to the other party's telephone terminal 400 (i.e. the calling telephone terminal or the called telephone terminal), which was connected in the process of s240 (s310).

Specifically, a control signal to clear the setting of the transmission path established in the process of s240 is provided to the path switching unit 19, and then the path switching unit 19 which has received the control signal clears the setting of the transmission path. Thus, the line between the multifunction machine 10 and the calling telephone terminal or the called telephone terminal through the telephone line network 100 is disconnected.

When it is determined in the process of s300 that a busy tone has not been received (s300: NO), the control unit 11 then determines whether or not the switch key has been operated (s320). This process is the same as the process of s260.

If it is determined in the process of s320 that the switch key has been operated (s320: YES), the control unit 11 then determines whether or not the line to the other party's telephone terminal 400 (i.e. the calling telephone terminal or the called telephone terminal) through the telephone line network 100 remains connected (s330). Specifically, it is determined whether or not the line to the other party's telephone terminal 400 which was connected in the process of s240 has been disconnected in the process of s310.

When it is determined in the process of s330 that the line has been disconnected (s330: NO), the control unit 11 notifies disconnection of the line (s340). Specifically, a control signal for reproducing a disconnection message is provided to the recording/reproducing unit 12, and the recording/reproducing unit 12 which has received the control signal reproduces the disconnection message by the message reproducing unit 12a. Then, a control signal for setting a transmission path of audio signals from the recording/reproducing unit 12 to the transmitter/receiver or the like in use is provided to the path switching unit 19, and the path switching unit 19 which has received the control signal performs setting of a transmission path of audio signals from the recording/reproducing unit 12 to the transmitter/receiver or the like. Thus, a disconnection message is output from the transmitter/receiver or the like.

Once the process of s310 or the process of s340 is completed, the procedure by the control unit 11 returns to the process of s300.

When it is determined in the process of s330 that the line remains connected (s330: YES), the control unit 11 makes the transmission path to be used for input/output of audio signals from/to the outside of the multifunction machine 10 switched from the audio cable 300 back to the telephone line network 100 (s350). Specifically, the transmission path to be used for input/output of audio signals from/to an outside source is set to the NCU 17 by the path switching unit 19, as in the process of s240, and thereby the transmission path to be used for input/output of audio signals from/to the outside of the multifunction machine 10 is switched from the audio cable 300 back to the telephone line network 100. Thus, the voice call between the multifunction machine 10 and the other party's telephone terminal 400 (i.e. the calling telephone terminal or the called telephone terminal) is resumed.

Then, the control unit 11 again notifies the transmission path used for input/output of audio signals from/to the outside of the multifunction machine 10 (s360). Specifically, as in the process of s250, the user I/F 13 displays a message indicating that the telephone line network 100 is used as the transmission path by the display panel 13b. Also, the handset terminal 30 displays the message indicating that the telephone line network 100 is used as the transmission path by the display panel 34.

Once the process of s360 is completed, the procedure by the control unit 11 returns to the process of s260.

On the other hand, when it is determined in the process of s320 that the switch key has not been operated (s320: NO), the control unit 11 then determines whether or not an on-hook operation has been performed (s370). This process is the same as the process of s270.

If it is determined in the process of s370 that an on-hook operation has not been performed (s370: NO), the procedure by the control unit 11 returns to the process of s300.

When it is determined in the process of s270 that an on-hook operation has been performed (s270: YES), or when it is determined in the process of s370 that an on-hook operation has been performed (s370: YES) after the processes from s260 to s370 are repeatedly performed, the control unit 11 disconnects the line to the other party's telephone terminal 400 (i.e. the calling telephone terminal or the called telephone terminal) which was connected in the process of s240 (s380). The process of s380, which is the same as the process of s310, is not performed if the line has already been disconnected in the above process of s310.

The control unit 11 then clears the setting of the transmission destination and the transmission source established in the above described processes (s390). Specifically, the path switching unit 19 clears the setting of the transmission destination and the transmission source of audio signals as in the process of s230.

ADVANTAGES

According to the multifunction machine 10 in the call system 1 configured as above, it is possible to switch the transmission destination (the output destination) of audio signals input from the outside of the multifunction machine 10 and the transmission source (the input source) of audio signals to be output to the outside between either the NCU 17 or the audio I/F 18, i.e. the telephone line network 100 or the PC 20 connected through the audio cable 300, by the operation of the operation keys 13a of the user I/F 13 or the switch key included in the operation keys 33 of the handset terminal 30.

In a state in which the transmission destination and the transmission source of audio signals are switched to the PC 20 by the operation of the switch key, audio based on the audio signals input from the PC 20 through the audio cable 300 is output from the transmitter/receiver or the like, and audio signals based on audio input from the transmitter/receiver or the like is output to the PC 20 through the audio cable 300.

Accordingly, as long as use of the Internet call function has been started at the PC 20, a voice call by the Internet call function may be performed indirectly by using the transmitter/receiver or the like of the multifunction machine 10.

In a state in which a line to the other party's telephone terminal 400 is connected in the process of s240 shown in FIG. 2 and also the transmission destination and the transmission source of audio signals are switched to the PC 20 in the process of s280, if it is determined in the process of s300 that a busy tone has been received, the line to the other party's telephone terminal 400 is automatically disconnected in the process of s310. In other words, the line to the other party's telephone terminal 400 through the telephone line network 100 remains in a connected state until a busy tone is received even after the transmission destination and the transmission source of audio signals are switched to the PC 20.

Therefore, if a voice from the other end cannot be heard after the transmission destination and the transmission source of audio signals are switched to the PC 20, it may be possible to confirm the status of the other end by switching the transmission destination and the transmission source of audio signals back to the telephone line network 100.

In the process of s300 shown in FIG. 2, reception of a busy tone from the telephone line network 100 through the NCU 17 can be detected as an indication of termination of a voice call through the telephone line network 100. Accordingly, when it is determined in the process of s300 that a busy tone has been received, i.e. the voice call through the telephone line network 100 has been terminated, the line to the other party's telephone terminal 400 can be disconnected in the process of s310.

In the processes of s250, s290 and s360 shown in FIG. 2, a message indicating the transmission path used for input/output of audio signals from/to the outside of the multifunction machine 10 is displayed on the display panel 13b of the user I/F 13 or the display panel 34 of the handset terminal 30. Therefore, a user can confirm to which of the telephone line network 100 and the audio cable 300 the transmission path has been switched, by the message on the display panel 13b or the display panel 34.

Also as described above, when it is determined in the process of s330 that the line to the other party's telephone terminal 400 through the telephone line network 100 has been disconnected, disconnection of the line is notified in the process of s340. Thus, a user can confirm that the line to the other party's telephone terminal 400 has been disconnected by the disconnection message output from the transmitter/receiver or the like.

MODIFICATIONS

Although the present invention has been described in connection with the above embodiment, the present invention is not limited to the embodiment, but may be embodied in various forms.

For example, while the telephone terminal according to the present invention is applied to the multifunction machine 10 in the above embodiment, the telephone terminal according to the present invention may be applied to any apparatus other than the multifunction machine 10 as long as the apparatus has a function as a telephone terminal.

While the processing procedure in FIG. 2 is performed by a computer system comprising the control unit 11 of the multifunction machine 10 in the above embodiment, a part of or the whole of the processing procedure in FIG. 2 may be performed by another computer system connected to the multifunction machine 10 through a cable or wireless signal transmission path.

Figure 3:
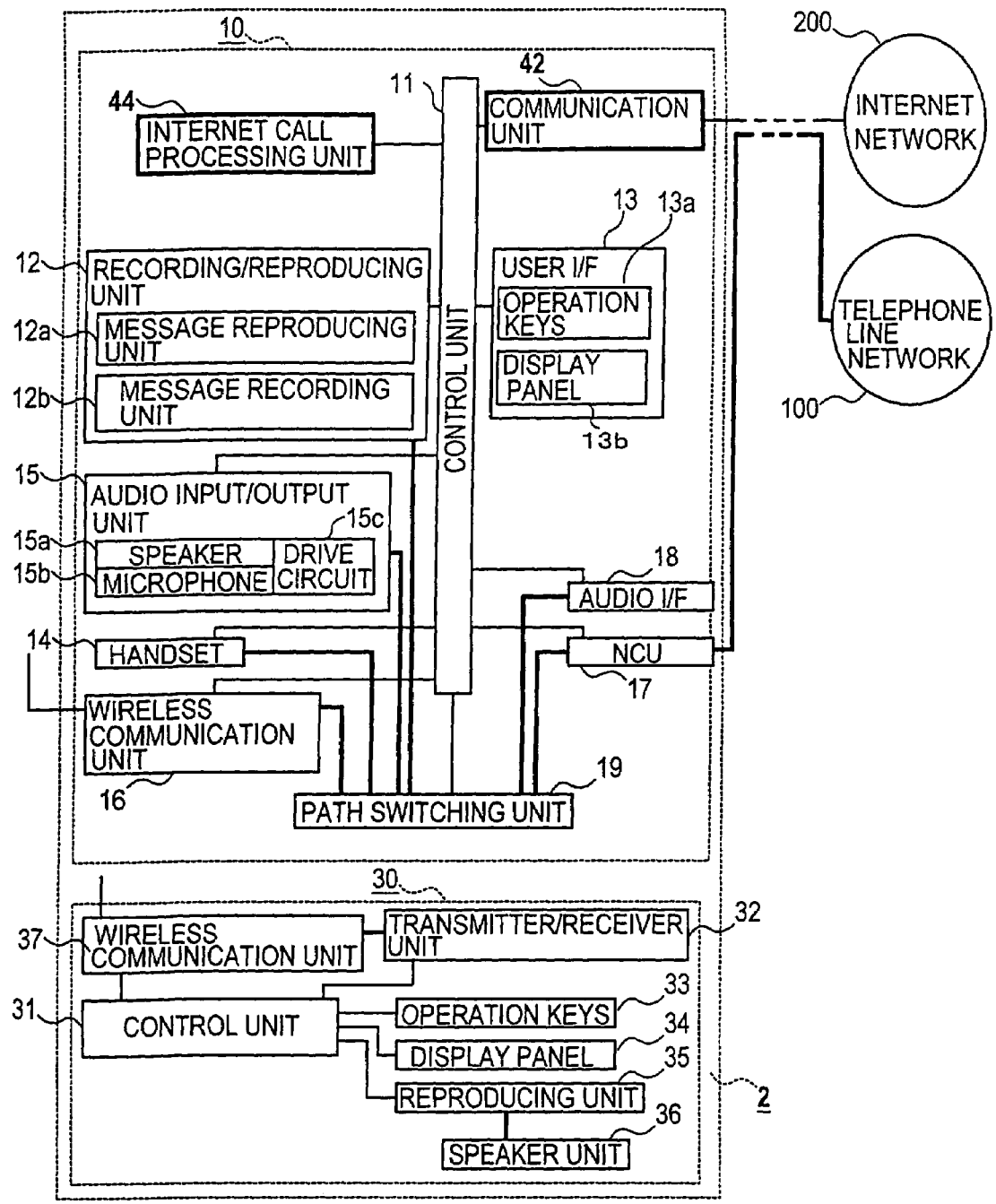
FIG. 3 is a block diagram showing the control system of a call system according to another preferred embodiment.

While the call system 1 of the above embodiment comprises the multifunction machine 10 and the PC 20 interconnected through the audio cable 300, the call system 1 may comprise only the multifunction machine 10 provided with components which function in the same manner as the PC 20. Specifically as a call system 2 shown in FIG. 3, the multifunction machine 10 may be provided with a communication unit 42 for connecting the multifunction machine 10 to the Internet network 200 and an Internet call processing unit 44 as a storage unit with the call software installed therein for making the control unit 11 function in the same manner as the PC 20 (i.e. the control unit 21 of the PC 20) which operates in accordance with the call software. In this case, the operation to establish a connection through the Internet network 200 is performed by the operation keys 13a of the user I/F 13.

In the above embodiment, the transmission destination and the transmission source of audio signals are switched to the PC 20 or the telephone line network 100 in the processes of s280 and s350 according to the operation of the switch key determined in the processes of s260 and s320, respectively. However, it may be possible to predetermine a specific operation procedure to switch the transmission destination and the transmission source of audio signals such that switching of the transmission destination and the transmission source of audio signals is triggered by an operation performed according to the specific operation procedure. The specific operation procedure is, for example, to long press (continue to press for a specific time period) a specific operation button or to operate a plurality of operation buttons according to a specific order.

In the above embodiment, reception of a busy tone is detected as an indication of termination of a voice call in the process of s300 in FIG. 2. However, reduction of the signal level of audio signals input from the telephone line network 100 through the NCU 17 below a predetermined threshold value may be detected as an indication of termination of a voice call.

Figure 4:
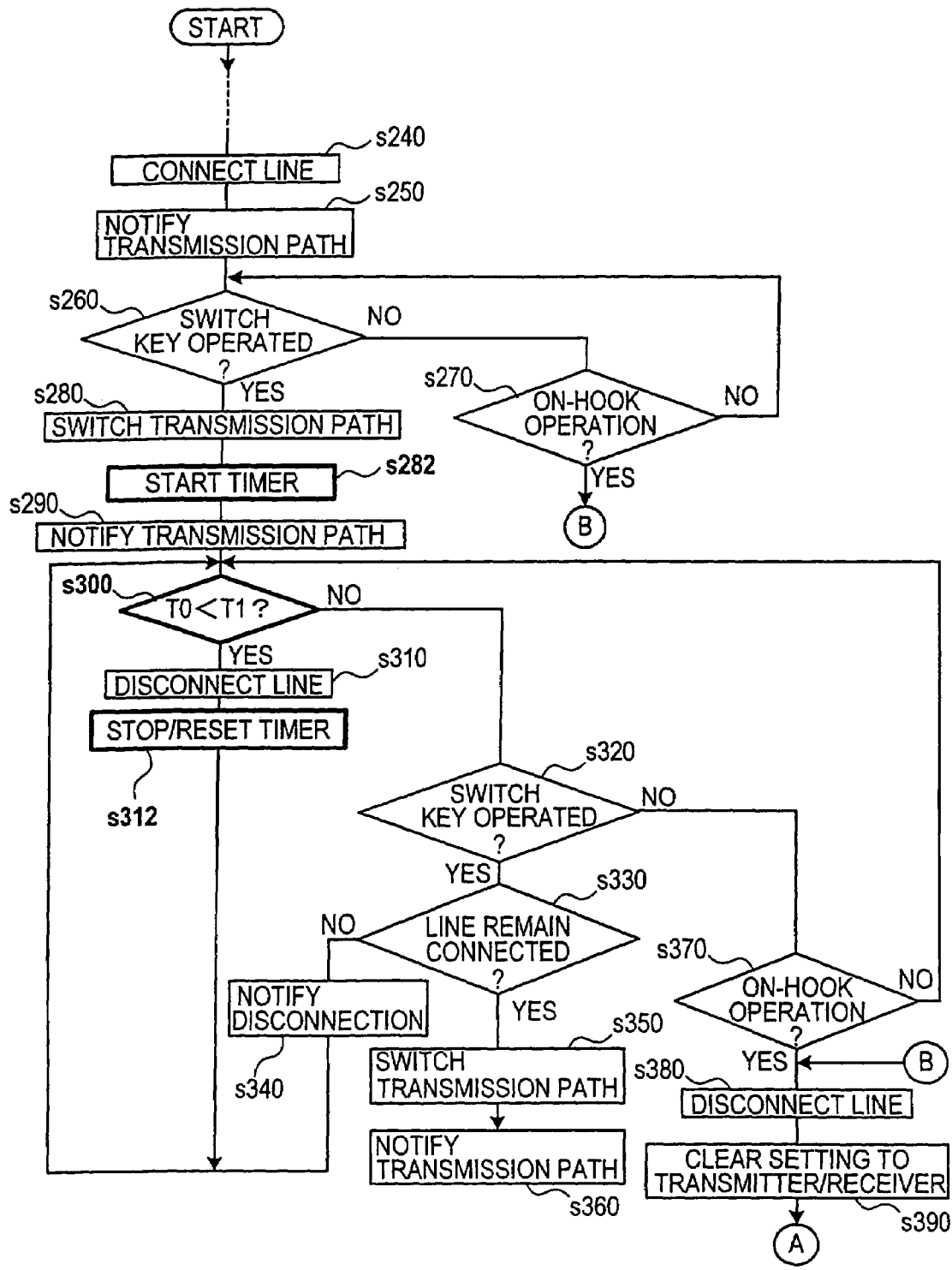
FIG. 4 is a flowchart showing a processing procedure executed by a multifunction machine according to the another preferred embodiment.

In the above embodiment, the condition for disconnecting the line to the other party's telephone terminal 400 in the process of s310 in FIG. 2 is that it is determined in the process of s300 that a busy tone has been received. However, the condition for disconnecting the line (the disconnection condition) may be that the state in which the transmission destination and the transmission source of audio signals are switched to the PC 20, i.e. the state in which a voice call by the Internet call function appears to be in progress, has continued for a predetermined time period. Specifically, as shown in FIG. 4, a timer is started (s282) subsequently to the process of s280, and only when it is determined that the count value t1 of the timer exceeds a predetermined value t0 (t0<t1) in the process of s300, which is different from s300 in FIG. 2, the procedure proceeds to the process of s310. And subsequently to the process of s310, the timer is stopped and reset (s312).

According to the above described configuration, after a line to the other party's telephone terminal 400 is connected in the process of s240, when the state in which the transmission destination and the transmission source of audio signals are switched to the PC 20 in the process of s280, i.e. the state in which a voice call by the Internet call function is in progress, has continued for a predetermined time period t0, and thus it is determined that the disconnection condition is satisfied, the line to the other party's telephone terminal 400 can be disconnected in the process of s310.

In the above embodiment, the transmission path used for input/output of audio signals from/to the outside of the multifunction machine 10 is notified by displaying a message indicating the transmission path used on the display panel 13b of the user I/F 13 and the display panel 34 of the handset terminal 30 in the processes of s250, s290 and s360 in FIG. 2. However, notification of the transmission path used may be performed such that, in the processes of s250, s290 and s360, a control signal for outputting a message indicating the transmission path used as audio is provided to the audio input/output unit 15 (and the handset terminal 30) and the audio input/output unit 15 (and the handset terminal 30) which have received the control signal output the message indicating the transmission path used as audio from the speaker 15a (and the reproducing unit 35 and the speaker unit 36). In this case, a user can confirm to which of the telephone line network 100 and the audio cable 300 the transmission path is switched by the message output from the speaker 15a (and the speaker unit 36).

In the above embodiment, disconnection of the line is notified by outputting a disconnection message as audio from the transmitter/receiver or the like in the process of s340. However, it may be possible that a control signal for displaying a message indicating disconnection of the line is provided to the user I/F 13 and the handset terminal 30, and the user I/F 13 and the handset terminal 30 which have received the control signal display the message indicating disconnection of the line on the display panels 13b and 34. Thus, a user can confirm disconnection of the line by the message displayed on the display panels 13b and 34.

In the above embodiment, if it is determined in the process of s320 that the switch key has been operated and it is also determined in the process of s330 that the line has been disconnected, disconnection of the line is notified in the process of s340, and then the procedure returns to the process of s300 without switching the transmission path. However, it may be possible that when it is determined in the process of s330 that the line has been disconnected, the transmission path is switched in the same manner as in the process of s350 instead of notifying disconnection of the line, and that the procedure then returns to the process of s260 instead of the process of s300.

In the above embodiment, if it is determined in the process of s320 that the switch key has been operated and it is also determined in the process of s330 that the line has been disconnected, disconnection of the line is notified in the process of s340, and then the procedure returns to the process of s300 without switching the transmission path. This is because the voice call with the other party's telephone terminal 400 cannot be resumed even if the transmission path is switched to the telephone line network 100 once the line to the other party's telephone terminal 400 is disconnected in the process of s310. However, it may be possible to resume the voice call with the other party's telephone terminal 400, the line to which has been disconnected in the process of s310, by calling the other party's telephone terminal 400, even when it is determined in the process of s330 that the line has been disconnected. To call the other party's telephone terminal 400 the line to which has been disconnected in the process of s310, in order to resume the voice call, a part of the processing procedure in FIG. 2 should be changed, for example, as shown in FIG. 5.

Figure 5:
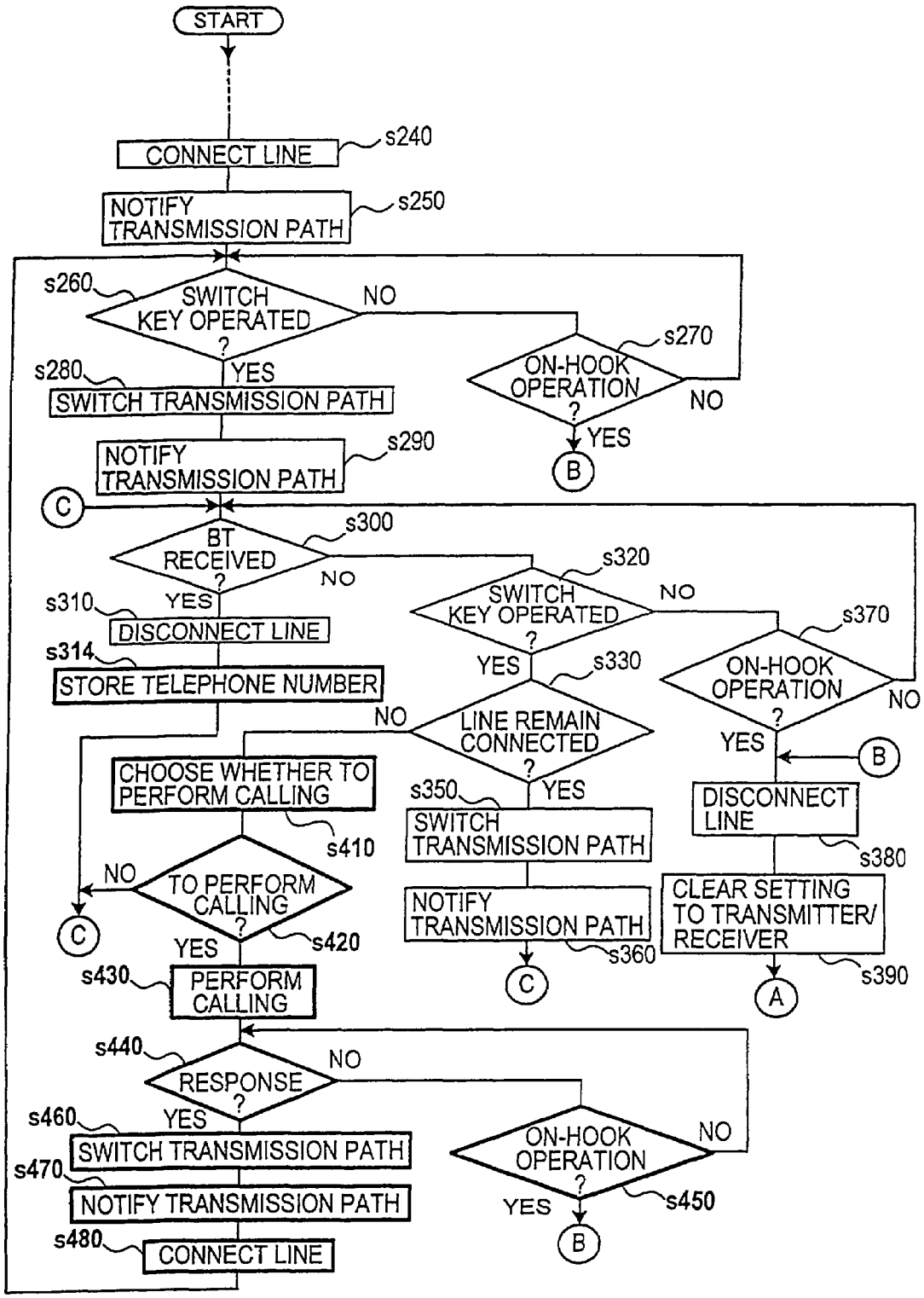
FIG. 5 is a flowchart showing a processing procedure executed by a multifunction machine according to a further preferred embodiment.

Referring to FIG. 5, after the line is disconnected in the process of s310, the telephone number of the other party's telephone terminal 400, the line to which has been disconnected, is stored in a memory provided in the control unit 11 (s314). Specifically, in a case in which the line is connected to the called telephone terminal by calling from the multifunction machine 10 in the process of s180, the telephone number of the called telephone terminal specified in the process of s180 is stored. In a case in which the line is connected to the calling telephone terminal by responding to an incoming call from the calling telephone terminal (i.e. by performing an off-hook operation) in the process of s130, the telephone number of the calling telephone terminal notified from the telephone line network 100 (i.e. switchboards constituting the telephone line network 100) is stored.

The control unit 11 allows the user to choose whether or not to perform calling to the other party's telephone terminal 400 the line to which has been disconnected in the process of s310, when it is determined in the process of s330 that the line has been disconnected (s410). In this process, a control signal for displaying a message indicating that the user may choose whether or not to perform calling to the other party's telephone terminal 400 is provided to the user I/F 13 and the handset terminal 30, and the user I/F 13 and the handset terminal 30 which have received the control signal display the message by the display panel 13b and the display panel 34.

When the message is displayed, the user performs an operation to perform calling (e.g. pressing "1" key) or an operation not to perform calling (e.g. pressing "0" key) using the operation keys 13a and 33.

When it is determined in the process of s420 that an operation not to perform calling is performed by the user (s420: NO), the procedure by the control unit 11 returns to the process of s300.

When it is determined in the process of s420 that an operation to perform calling is performed by the user (s420: YES), the control unit 11 performs calling of the telephone number stored in the memory in the process of s314 (s430). Calling in this process is performed in the same manner as in the process of s200.

If it is determined in the process of s440 that the called telephone terminal has not responded to the calling performed in the process of s430 (s440: NO), it is then determined whether or not an on-hook operation has not been performed as in the process of s220 (s450).

When it is determined in the process of s450 that an on-hook operation has not been performed (s450: NO), the procedure by the control unit 11 returns to the process of s440, while when it is determined that an on-hook operation has been performed (s450: YES), the procedure proceeds to the process of s380.

If it is determined in the process of s440 that the called telephone terminal has responded to the calling performed in the process of s430 (s440: YES), the control unit 11 performs switching of the transmission path (s460), notification of the transmission path (s470) and connection of the line (s480) in the same manner as in the processes of s350, s360 and s240, respectively, and then the procedure returns to the process of s260.

According to the present configuration as described above, if it is determined in the process of s320 that the switch key has been operated after the telephone number of the other party's telephone terminal 400 the line to which has been disconnected, is stored in the memory in the process of s314 when the line is disconnected in the process of 310, calling is performed based on the telephone number stored in the memory and the line is connected if the called telephone terminal responds to the calling. Thus, even after the line is disconnected in the process of s310, the voice call with the other party's telephone terminal 400 the line to which has been disconnected, can be resumed.

Furthermore, according to the present configuration, calling to the telephone number stored in the memory is not performed unless an operation to perform calling is performed in the process of s410. In other words, the user may make the multifunction machine 10 perform calling to the called telephone terminal only when the user wants to resume the voice call with the other party's telephone terminal 400 through the telephone line network 100. Thus, unintended calling to the called telephone terminal and connection of the line thereto can be prevented.

The operation to be performed by the user in the process of s410 to choose whether or not to perform calling to the telephone terminal is not limited to pressing specific keys included in the operation keys 13a and 33. For example, it may be possible to predetermine a specific operation procedure indicating whether or not to perform calling, and to determine that a choice as to whether or not to perform calling has been made by the user when an operation is performed according to the specific operation procedure. The specific operation procedure is, for example, to long press (continue to press for a specific time period) a specific operation button or to operate a plurality of operation buttons according to a specific order.

What is claimed is:

1. A telephone terminal provided with a telephone connection unit for connecting a line to another party's telephone terminal as a telephone terminal on the other end of the line through a telephone line network, for performing a voice call with the other party's telephone terminal through the telephone line network, the telephone terminal comprising:

an audio input/output unit provided in addition to the telephone connection unit and capable of inputting/outputting audio signals;

a switch unit for switching an output destination of audio signals based on audio input from a transmitter/receiver and an input source of audio signals to be outputted as audio from the transmitter/receiver between the telephone line network and the audio input/output unit according to an operation of a user; and a control unit for disconnecting the line to the other party's telephone terminal through the telephone line network when a predetermined control condition is satisfied in a state in which the line to the other party's telephone terminal is connected by the connection unit and the output destination and input source of audio signals are switched to the audio input/output unit by the switch unit.

2. The telephone terminal as set forth in claim 1, further comprising:

a detection unit for detecting termination of the voice call with the other party's telephone terminal to which the line is connected by the telephone connection unit, based on audio signals input/output from/to the other party's telephone terminal through the telephone line network, wherein the control unit disconnects the line to the other party's telephone terminal when termination of the voice call is detected by the detection unit as an indication that the predetermined disconnection condition is satisfied.

3. The telephone terminal as set forth in claim 2, wherein the detection unit detects an input of a control signal indicating the termination of a voice call from the telephone line network as an indication that the voice call with the other party's telephone terminal is terminated.

4. The telephone terminal as set forth in claim 3, wherein the control signal includes a busy tone signal.

5. The telephone terminal as set forth in claim 1, wherein the control unit disconnects the line to the other party's telephone terminal when the state in which the output destination and input source of audio signals are switched to the audio input/output unit by the switch unit has continued for a predetermined time period since the line to the other party's telephone terminal is connected by the connection unit as an indication that the predetermined disconnection condition is satisfied.

6. The telephone terminal as set forth in claim 1, further comprising a switching notification unit for notifying to which of the telephone line network and the audio input/output unit the output destination and input source of audio signals are switched.

7. The telephone terminal as set forth in claim 6, further comprising:

a display unit for displaying a variety of information, wherein the switching notification unit notifies, by displaying on the display unit, the telephone line network and the audio input/output unit, the output destination and input source of audio signals are switched.

8. The telephone terminal as set forth in claim 1, further comprising a disconnection notification unit for notifying that the line to the other party's telephone terminal is disconnected when the output destination and input source of audio signals are switched back to the telephone line network by the switch unit after the line to the other party's telephone terminal is disconnected by the control unit.

9. The telephone terminal as set forth in claim 8, wherein the disconnection notification unit notifies that the line to the other party's telephone terminal is disconnected by outputting audio indicating the disconnection of the line from the transmitter/receiver.

10. The telephone terminal as set forth in claim 1, further comprising:

a storage unit for storing the telephone number of the other party's telephone terminal when the line to the other party's telephone terminal is disconnected by the control unit, wherein the telephone connection unit performs calling to the other party's telephone terminal based on the telephone number stored by the storage unit when the output destination and input source of audio signals are switched back to the telephone line network by the switch unit after the line to the other party's telephone terminal is disconnected by the control unit, and connects the line to the other party's telephone terminal if the other party's telephone terminal responds to the calling.

11. The telephone terminal as set forth in claim 10, further comprising:

a calling instruction unit for instructing the telephone connection unit to perform calling to the other party's telephone terminal based on the telephone number stored by the storage unit, according to an operation of the user, wherein the telephone connection unit performs calling to the other party's telephone terminal based on the telephone number stored by the storage unit when the output destination and input source of audio signals are switched back to the telephone line network by the switch unit after the line to the other party's telephone terminal is disconnected by the control unit as well as when calling is instructed by the calling instruction unit.

12. A call system comprising:

an Internet connection unit for connecting a line to another party's Internet terminal as an Internet terminal on the other end of the line through an Internet network;

an Internet terminal for inputting/outputting audio signals transmitted from the other party's Internet terminal connected by the Internet connection unit through the Internet network; and a telephone terminal connected to the Internet terminal through an audio transmission path capable of transmitting audio signals, wherein the Internet terminal inputs/outputs audio signals from/to the telephone terminal and makes audio based on the audio signals input/output from a transmitter/receiver provided in the telephone terminal thereby to perform a voice call, and wherein the telephone terminal is provided with a telephone connection unit for connecting a line to the other party's telephone terminal as a telephone terminal on the other end of the line through a telephone line network, for performing a voice call with the other party's telephone terminal through the telephone line network, the telephone terminal including:

an audio input/output unit provided in addition to the telephone connection unit and capable of inputting/outputting audio signals;

a switch unit for switching an output destination of audio signals based on audio input from the transmitter/receiver and an input source of audio signals to be output as audio from the transmitter/receiver between the telephone line network and the audio input/output unit according to an operation of a user; and a control unit for disconnecting the line to the other party's telephone terminal through the telephone line network when a predetermined disconnection condition is satisfied in a state in which the line to the other party's telephone terminal is connected by the connection unit and the output destination and input source of audio signals are switched to the audio input/output unit by the switch unit.

13. The call system as set forth in claim 12,
wherein the telephone terminal further comprises a detection unit for detecting termination of a voice call with the other party's telephone terminal to which the line is connected by the telephone connection unit, based on audio signals input/output from/to the other party's telephone terminal through the telephone line network, and
wherein the control unit disconnects the line to the other party's telephone terminal when termination of a voice call is detected by the detection unit as an indication that the predetermined disconnection condition is satisfied.

14. The call system as set forth in claim 13, wherein the detection unit detects an input of a control signal indicating the termination of a voice call from the telephone line network as an indication that the voice call with the other party's telephone terminal is terminated.

15. The call system as set forth in claim 14, wherein the control signal includes a busy tone signal.

16. The call system as set forth in claim 12, wherein the control unit disconnects the line to the other party's telephone terminal when the state in which the output destination and input source of audio signals are switched to the audio input/output unit by the switch unit has continued for a predetermined time period since the line to the other party's telephone terminal is connected by the connection unit as an indication that the predetermined disconnection condition is satisfied.

17. The call system as set forth in claim 12, wherein the telephone terminal further comprises a switching notification unit for notifying to which of the telephone line network and the audio input/output unit the output destination and input source of audio signals are switched.

18. The call system as set forth in claim 17,
wherein the telephone terminal further comprises a display unit for displaying a variety of information, and
wherein the switching notification unit notifies by displaying on the display unit to which of the telephone line network and the audio input/output unit the output destination and input source of audio signals are switched.

19. The call system as set forth in claim 12, wherein the telephone terminal further comprises a disconnection notification unit for notifying that the line to the other party's telephone terminal is disconnected when the output destination and input source of audio signals are switched back to the telephone line network by the switch unit after the line to the other party's telephone terminal is disconnected by the control unit.

20. The call system as set forth in claim 19, wherein the disconnection notification unit notifies that the line to the other party's telephone terminal is disconnected by outputting audio indicating disconnection of the line from the transmitter/receiver.

21. The call system as set forth in claim 12,
wherein the telephone terminal further comprises a storage unit for storing the telephone number of the other party's telephone terminal when the line to the other party's telephone terminal is disconnected by the control unit, wherein the telephone connection unit performs calling to the other party's telephone terminal based on the telephone number stored by the storage unit when the output destination and input source of audio signals are switched back to the telephone line network by the switch unit after the line to the other party's telephone terminal is disconnected by the control unit, and wherein the telephone connection unit connects the line to the other party's telephone terminal if the other party's telephone terminal responds to the calling.

22. The call system as set forth in claim 21,
wherein the telephone terminal further comprises a calling instruction unit for instructing the telephone connection unit to perform calling to the other party's telephone terminal based on the telephone number stored by the storage unit, according to the operation of the user, and
wherein the telephone connection unit performs calling to the other party's telephone terminal based on the telephone number stored by the storage unit when the output destination and input source of audio signals are switched back to the telephone line network by the switch unit after the line to the other party's telephone terminal is disconnected by the control unit as well as when calling is instructed by the calling instruction unit.

23. A telephone terminal provided with a telephone connection unit for connecting a line to another party's telephone terminal as a telephone terminal on the other end of the line through a telephone line network, for performing a voice call with the other party's telephone terminal through the telephone line network, and with an Internet connection unit for connecting a line to the other party's Internet terminal as an Internet terminal on the other end of the line through an Internet network for performing a voice call with the other party's Internet terminal through the Internet network, the telephone terminal comprising:

a switch unit for switching an output destination of audio signals based on audio input from a transmitter/receiver and an input source of audio signals to be output as audio from the transmitter/receiver between the telephone line network and the Internet network according to an operation of a user; and a control unit for disconnecting the line to the other party's telephone terminal through the telephone line network when a predetermined disconnection condition is satisfied in a state in which the line to the other party's telephone terminal is connected by the connection unit, the line to the other party's Internet terminal is connected by the Internet connection unit, and the output destination and input source of audio signals are switched to the Internet network by the switch unit.

24. The telephone terminal as set forth in claim 23, further comprising:

a detection unit for detecting termination of a voice call with the other party's telephone terminal to which the line is connected by the telephone connection unit, based on audio signals input/output from/to the other party's telephone terminal through the telephone line network, wherein the control unit disconnects the line to the other party's telephone terminal when termination of a voice call is detected by the detection unit as an indication that the predetermined disconnection condition is satisfied.

25. The telephone terminal as set forth in claim 24, wherein the detection unit detects an input of a control signal indicating the termination of a voice call from the telephone line network as an indication that the voice call with the other party's telephone terminal is terminated.

26. The telephone terminal as set forth in claim 23, wherein the control unit disconnects the line to the other party's telephone terminal when the state in which the output destination and input source of audio signals are switched to the Internet network by the switch unit has continued for a predetermined time period since the line to the other party's telephone terminal is connected by the connection unit as an indication that the predetermined disconnection condition is satisfied.

27. The telephone terminal as set forth in claim 23, further comprising a switching notification unit for notifying to which of the telephone line network and the Internet network, the output destination and input source of audio signals are switched.

28. The telephone terminal as set forth in claim 27, further comprising:
   a display unit for displaying a variety of information,
   wherein the switching notification unit notifies, by displaying on the display unit, to which of the telephone line network and the Internet network, the output destination and input source of audio signals are switched.

29. The telephone terminal as set forth in claim 23, further comprising a disconnection notification unit for notifying that the line to the other party's telephone terminal is disconnected when the output destination and input source of audio signals are switched back to the telephone line network by the switch unit after the line to the other party's telephone terminal is disconnected by the control unit.

30. The telephone terminal as set forth in claim 29, wherein the disconnection notification unit notifies that the line to the other party's telephone terminal is disconnected by outputting audio indicating the disconnection of the line from the transmitter/receiver.

31. The telephone terminal as set forth in claim 23, further comprising:
   a storage unit for storing the telephone number of the other party's telephone terminal when the line to the other party's telephone terminal is disconnected by the control unit,
   wherein the telephone connection unit performs calling to the other party's telephone terminal based on the telephone number stored by the storage unit when the output destination and input source of audio signals are switched back to the telephone line network by the switch unit after the line to the other party's telephone terminal is disconnected by the control unit, and
   wherein the telephone connection unit connects the line to the other party's telephone terminal if the other party's telephone terminal responds to the calling.

32. The telephone terminal as set forth in claim 31, further comprising:
   a calling instruction unit for instructing the telephone connection unit to perform calling to the other party's telephone terminal based on the telephone number stored in the storage unit, according to an operation of the user,
   wherein the telephone connection unit performs calling to the other party's telephone terminal based on the telephone number stored in the storage unit when the output destination and input source of audio signals are switched back to the telephone line network by the switch unit after the line to the other party's telephone terminal is disconnected by the control unit as well as when calling is instructed by the calling instruction unit.

33. A computer readable storage medium storing a computer executable terminal control program to make a computer system execute a variety of processes for controlling a telephone terminal that performs a voice call with the other party's telephone terminal through a telephone line network, the terminal control program including:
   a telephone connection process for connecting the line to the other party's telephone terminal through the telephone line network;
   a switch process for switching an output destination of audio signals based on audio input from a transmitter/receiver and an input source of audio signals to be output as audio from the transmitter/receiver between the telephone line network and an audio input/output unit for inputting/outputting audio signals according to an operation by a user; and
   a disconnection process for disconnecting the line to the other party's telephone terminal through the telephone line network when a predetermined disconnection condition is satisfied in a state in which the line to the other party's telephone terminal is connected in the telephone connection process, and the output destination and input source of audio signals are switched to the audio input/output unit in the switch process.

34. A computer readable storage medium for storing a computer executable terminal control program to make a computer system execute a variety of processes for controlling a telephone terminal that performs a voice call with the other party's telephone terminal through a telephone line network and performs a voice call with the other party's Internet terminal through an Internet network, the terminal control program including:
   a telephone connection process for connecting the line to the other party's telephone terminal through the telephone line network;
   an Internet connection process for connecting the line to the other party's Internet terminal through the Internet network;
   a switch process to switch an output destination of audio signals based on audio input from a transmitter/receiver and an input source of audio signals to be output as audio from the transmitter/receiver between the telephone line network and the Internet network according to an operation of a user; and
   a disconnection process for disconnecting the line to the other party's telephone terminal through the telephone line network when a predetermined disconnection condition is satisfied in a state in which the line to the other party's telephone terminal is connected in the telephone connection process, the line to the other party's Internet terminal in the Internet connection process, and the output destination and input source of audio signals are switched to the Internet network in the switch process.

* * * * *